United States Patent
Sarangi et al.

(10) Patent No.: US 12,517,048 B2
(45) Date of Patent: Jan. 6, 2026

(54) LIGHT SCATTERING MEASUREMENT BASED ON SKIP LIGHT PULSES

(71) Applicant: TEXAS INSTRUMENTS INCORPORATED, Dallas, TX (US)

(72) Inventors: Pulak Sarangi, La Jolla, CA (US); Kaichien Tsai, Allen, TX (US); Boyu Shen, McKinney, TX (US); Anand G. Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 82 days.

(21) Appl. No.: 18/309,468

(22) Filed: Apr. 28, 2023

(65) Prior Publication Data
US 2024/0361238 A1 Oct. 31, 2024

(51) Int. Cl.
*G01N 21/53* (2006.01)

(52) U.S. Cl.
CPC ..... *G01N 21/53* (2013.01); *G01N 2201/0698* (2013.01); *G01N 2201/1247* (2013.01); *G01N 2201/129* (2013.01)

(58) Field of Classification Search
CPC .......... G01N 21/53; G01N 2201/0698; G01N 2201/1247; G01N 2201/129
USPC ....................................................... 356/338
See application file for complete search history.

(56) References Cited

U.S. PATENT DOCUMENTS

| | | | | |
|---|---|---|---|---|
| 3,887,815 A | * | 6/1975 | Kawakami | G01N 21/53 340/630 |
| 4,198,627 A | * | 4/1980 | Kakigi | G08B 17/107 340/630 |
| 4,651,013 A | * | 3/1987 | Kajii | G08B 29/043 340/630 |
| 7,301,630 B2 | * | 11/2007 | Furukawa | G01N 21/51 356/342 |
| 11,009,441 B2 | * | 5/2021 | Takeuchi | G01N 15/1459 |

* cited by examiner

*Primary Examiner* — Seung C Sohn
(74) *Attorney, Agent, or Firm* — Frank D. Cimino

(57) ABSTRACT

In some examples, a method includes transmitting first light pulses according to a pre-determined pulse pattern in a first measurement period. The method also includes transmitting second light pulses according to the pre-determined pulse pattern in a second measurement period consecutive to the first measurement period, in which at least some of the first and second light pulses being unequally spaced in time across the first and second measurement periods. The method also includes receiving first detection signals representing detection of the first light pulses. The method also includes receiving second detection signals representing detection of the second light pulses. The method also includes providing a first light scattering measurement signal representing the first measurement period responsive to the first detection signals. The method also includes providing a second light scattering measurement signal representing the second measurement period responsive to the second detection signals.

20 Claims, 7 Drawing Sheets

LIGHT SCATTERING MEASUREMENT BASED ON SKIP LIGHT PULSES

BACKGROUND

Light scattering can occur when light propagates through particles (e.g., smoke particles, blood cells, etc.) in a space and scattered by the particles in the space. A light scattering measurement device can emit light into the space, and sense the light that propagates through the space to measure the scattering of light (if any). Based on the measurement, the presence of certain particles of interest in the space can be detected, and the concentration of those particles in the space may also be determined.

SUMMARY

In some examples, an apparatus includes a light source, a light detector, and a processing circuit having a processing input, a processing output, and a control output, the control output coupled to the light source, the processing input coupled to the light detector. The processing circuit is configured to control the light source to transmit first light pulses and second light pulses according to a pre-determined pulse pattern in consecutive first and second measurement periods, at least some of the first and second light pulses being unequally spaced in time across the first and second measurement periods. The processing circuit is also configured to receive first detection signals representing detection of the first light pulses from the light detector. The processing circuit is also configured to receive second detection signals representing detection of the second light pulses from the light detector. The processing circuit is also configured to provide a first light scattering measurement signal representing the first measurement period at the processing output responsive to the first detection signals. The processing circuit is also configured to provide a second light scattering measurement signal representing the second measurement period at the processing output responsive to the second detection signals.

In some examples, a method includes transmitting, with a light source, first light pulses according to a pre-determined pulse pattern in a first measurement period. The method also includes transmitting, with the light source, second light pulses according to the pre-determined pulse pattern in a second measurement period consecutive to the first measurement period, in which at least some of the first and second light pulses being unequally spaced in time across the first and second measurement periods. The method also includes receiving, from a light detector, first detection signals representing detection of the first light pulses. The method also includes receiving, from the light detector, second detection signals representing detection of the second light pulses. The method also includes providing a first light scattering measurement signal representing the first measurement period responsive to the first detection signals. The method also includes providing a second light scattering measurement signal representing the second measurement period responsive to the second detection signals.

In some examples, a computer readable medium comprises computer-executable instructions. The instructions are executable by a processor to cause the processor to be configured to transmit, with a light source, first light pulses according to a pre-determined pulse pattern in a first measurement period, transmit, with the light source, second light pulses according to the pre-determined pulse pattern in a second measurement period consecutive to the first measurement period, in which at least some of the first and second light pulses being unequally spaced in time across the first and second measurement periods, receive, from a light detector, first detection signals representing detection of the first light pulses, receive, from the light detector, second detection signals representing detection of the second light pulses, provide a first light scattering measurement signal representing the first measurement period responsive to the first detection signals, and provide a second light scattering measurement signal representing the second measurement period responsive to the second detection signals.

BRIEF DESCRIPTION OF THE DRAWINGS

In this description, the same reference numbers depict same or similar (by function and/or structure) features. The drawings are not necessarily drawn to scale.

DETAILED DESCRIPTION

As described above, a light scattering measurement device emits light into a space, and senses the light that propagates through the space to measure the scattering of light (if any). Based on the measurement, the presence of certain particles of interest in the space can be detected, and the concentration of the particles in the space may also be determined. There can be many applications for a light scattering measurement device, such as smoke detection, photoplethysmography (PPG), etc.

Figure 1:
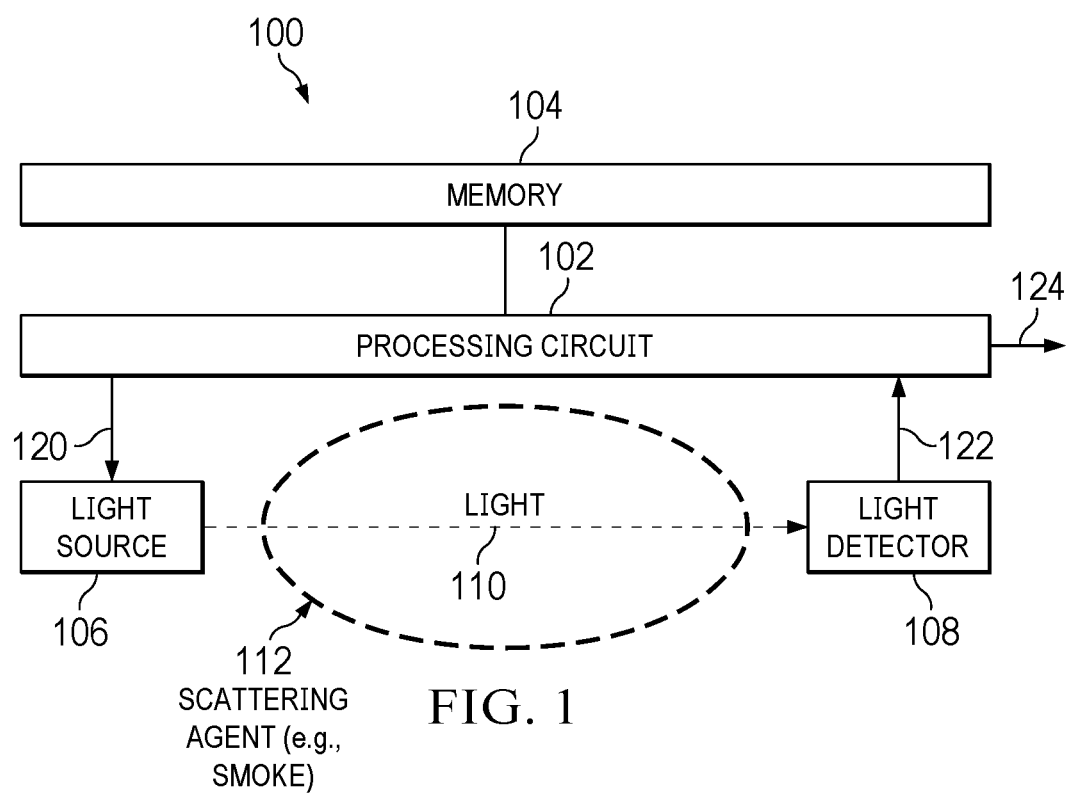
FIG. 1 is a block diagram of a light scattering measurement device, in accordance with various examples.

FIG. 1 is a block diagram of a light scattering measurement device 100, in accordance with various examples. The light scattering measurement device 100 includes a processing circuit 102, a memory 104, a light source 106, and a light detector 108. The processing circuit 102 has a first processing input, a second processing input, a processing output (not shown), and a control output. The first processing input is coupled to the light detector 108, the second processing input is coupled to the memory 104, and the control output is coupled to the light source 106. In an example, the processing output is coupled to a device (not shown) to which the light scattering measurement device 100 provides a light scattering measurement signal. The processing circuit 102 may be any suitable circuit or component capable of performing processing and/or control, such as a processer, microprocessor, controller, microcontroller, field-programmable gate array (FPGA), or any other combination of analog and/or digital components arranged in an architecture that provides processing and control capabilities.

In some examples, the memory 104 is a non-transitory memory that stores instructions for execution by the processing circuit 102. The memory 104 may also store a dictionary, as described herein. The light source 106 is, in some examples, a light emitting diode (LED). The LED may be an infrared LED or a non-infrared LED. In other examples, the light source 106 is any other suitable source of light other than an LED. The light detector 108 is, in some examples, a photo-emitting diode, or photodiode for short. In other examples, the light detector 108 is any device capable of providing an output signal responsive to a detection of light.

In an example operation, the processing circuit 102 provides a control signal 120 to control the light source 106 to emit light 110. In a case where a scattering agent 112 (e.g., smoke particles, blood cells, or other particles of interest) is present between light source 106 and light detector 108, some or all of light 110 can be scattered by scattering agent 112, and the scattered light 110 can be detected by light detector 108. Light detector 108 outputs a detection signal 122 representative of the scattered light 110 to processing circuit 102. Processing circuit 102 can also receive reference data representing the scattering of light 110 by particles of interest (e.g., smoke particles, blood cells, etc.) from memory 104. Processing circuit 102 can compare detection signal 122 against the reference data, determine whether the light scattering condition represented by the detection signals indicate that the particles of interest are present and/or the concentration of such particles exceeds a threshold based on the comparison result, and provide an indication signal 124 indicating such.

In some examples, light scattering measurement device 100 may include a chamber that houses light source 106 and light detector 108. The chamber can block ambient light outside the chamber from reaching light detector 108, while allowing particles to enter into the chamber through an opening of the chamber and scatter light 110. The ambient light may have an intensity that varies with time and, if received by light detector 108, can introduce an interference component in the detection signal 122. By blocking the ambient light from reaching light detector 108, the interference component can be reduced, which can improve the accuracy of the light scattering detection/measurement operation. However, small particles with low momentum may be unable to enter the chamber, which may reduce the sensitivity of light scattering measurement device 100 in detecting/measuring such particles. The inclusion of chamber may also increase the manufacturing complexity and cost of light scattering measurement device 100.

In some examples, light scattering measurement device 100 may operate in a chamberless arrangement, or a partial chamberless arrangement, in which light detector 108 is exposed to more ambient light than in a case where light detector 108 is housed inside the chamber. The chamberless (or partial chamberless) arrangements facilitate movement of particles into the space between light source 106 and light detector 108, including particles of low momentum that may otherwise be blocked by a chamber, and improve the sensitivity of light scattering measurement device 100 in detecting/measuring such particles. The chamberless (or partial chamberless) arrangements may also reduce the manufacturing complexity and cost of light scattering measurement device 100. As to be described below, processing circuit 102 can perform processing operations on detection signal 122 to reduce the interference component caused by ambient light, which may allow light scattering measurement device 100 to operate in a chamberless (or partial chamberless) arrangement.

In some examples, processing circuit 102 can control light source 106 to emit a sequence of light pulses as light 110 towards light detector 108. The timing of the light pulses can be defined in control signal 120. Each light pulse can be scattered by light 110 by scattering agent 112 (if present) and received by light detector 108, and the detection signal 122 generated from each light pulse can represent a sample of the light scattering condition. Accordingly, a sequence of light pulses can provide multiple samples of the light scattering condition at different times. The sequence of light pulses to be transmitted by light source 106 can be defined in control signal 120. Processing circuit 102 can receive detection signals 122, perform demodulation on the detection signals to convert to a baseband signal, and sample and digitalize the baseband signal to generate digital samples. In some examples, processing circuit 102 can generate detection signal 122 by averaging the digital samples. If the particle of interest is present, the scattered light attributed to such particles can provide a direct current (DC) component across the samples, and the DC component can be extracted by averaging. On the other hand, various transient noises, such as interference component caused by ambient light, can be alternating current (AC) components and can be cancelled out or attenuated by the averaging operation. Such arrangements can reduce the effect of transient noise on the light scattering detection/measurement and may allow light scattering measurement device 100 to operate in a chamberless (or partial chamberless) arrangement.

Figure 2:
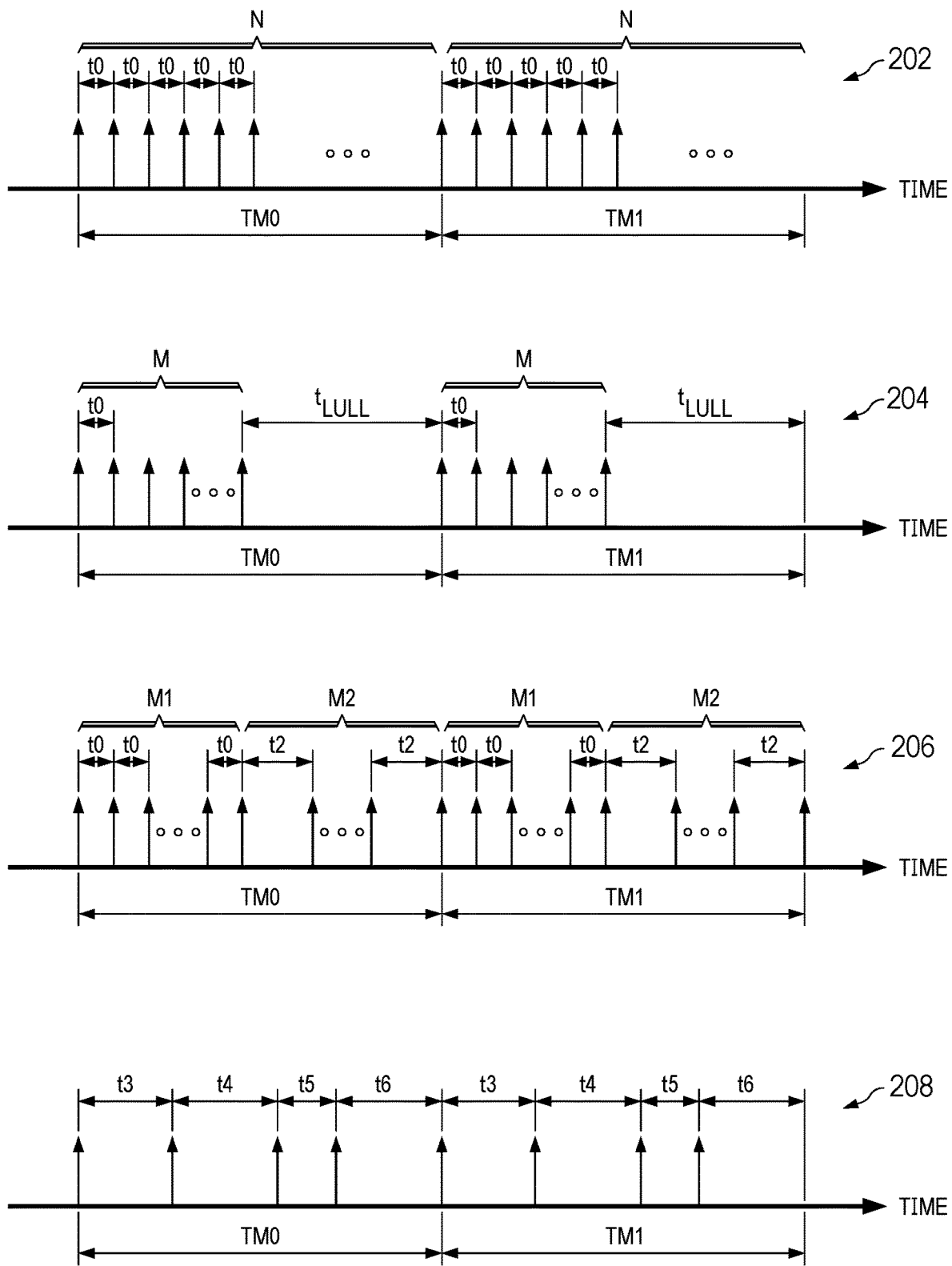
FIG. 2 includes graphs illustrating various pulse patterns used by a light scattering measurement device, in accordance with various examples.

FIG. 2 includes graphs 202, 204, 206, and 208 illustrating example sequences of light pulses. In some examples, referring to graph 202, processing circuit 102 can control light source 106 to emit light pulses according to a uniform pulse pattern. In the example uniform pulse pattern of graph 202, the light pulses are evenly spaced in time by a same unit time interval t0 (e.g., 10 microseconds (us)) in each measurement periods, and across multiple measurement periods, denoted as TM0 and TM1 in FIG. 2, to perform periodic sampling of the light scattering. In each measurement period, light source 106 can transmit an N number of pulses (e.g., 128 pulses, 256 pulses, etc.). Processing circuit 102 can generate N samples from detection signals 122, with each sample corresponding to a light pulse and separated by time interval t0. Such arrangements, however, can lead to light source 106 generating and emitting a large number of light pulses in each measurement period, which can lead to huge power consumption.

In some examples, to reduce power consumption, processing circuit 102 can control light source 106 to emit light pulses following a pre-determined skip pulse pattern defined in control signal 120. The skip pulse pattern can define, for example, an M number of light pulses in a measurement period, with the number M being lower than N. Some of the light pulses are not evenly spaced across two consecutive/adjacent measurement periods. By reducing the number of light pulses emitted in each measurement period, the power consumption can be reduced. Processing circuit 102 can also generate M samples from detection signals 122 in a measurement period, with each sample corresponding to a light pulse in the measurement period.

Graphs 204, 206, and 208 illustrate examples of skip pulse patterns. Referring to graph 204, in each measurement period (TM0, TM1), the skip pulse pattern may define an M number of light pulses each spaced apart by t0 (or other time interval), followed by a lull interval $t_{LULL}$, in which light source 106 does not transmit any light pulse. The lull interval $t_{LULL}$ is larger than and is a multiple of the unit interval t0, so that light source 106 can skip transmission of multiple light pulses spaced apart by t0 within lull interval $t_{LULL}$ according to the skip pulse pattern of graph 204.

Graph 206 represents an example nested skip pulse pattern. Referring to graph 206, in each measurement period, the skip pulse pattern may define an M1 number of light pulses followed by an M2 number of light pulses, with M equals a sum of M1 and M2. The M1 number of light pulses are evenly spaced apart by t0 or other time interval, and the M2 number of light pulses are evenly spaced apart by an interval t2. Each interval t2 is larger than and is a multiple of the unit interval t0, so that light source 106 can skip transmission of multiple light pulses spaced apart by to within each interval t2 according to the nested skip pulse pattern of graph 206.

Further, referring to graph 208, the skip pulse pattern may define M number of unevenly spaced light pulses in a measurement period. For example, the example skip pulse pattern in graph 208 may define four light pulses (M=4) in a measurement period (TM0, TM1), where the first pair of light pulses are spaced apart by an interval t3, the second pair of light pulses are spaced apart by an interval t4, the third pair of light pulses are spaced apart by an interval t5, and the last light pulse of a measurement period (e.g., TM0) and the first light pulse of a subsequent measurement period (e.g., TM1) are spaced apart by an interval 16. Each of intervals t3, t4, 5, and t6 can be larger than and is a multiple of the unit interval t0, so that light source 106 can skip transmission of multiple light pulses spaced apart by t0 within each of intervals t3, t4, 5, and t6 according to the skip pulse pattern of graph 208.

Although light source 106 transmitting light pulses following a skip pulse pattern can reduce the number of light pulses transmitted and power consumption, the detection signals 122 generated from the light pulses may represent subsamples (M samples in a measurement period) of the light scattering condition, or a compressed version of the full samples (e.g., N samples in a measurement period) that would otherwise be generated from the full periodic light pulse pattern of graph 202, with samples corresponding to the skipped light pulses discarded. Because of the discarded samples, the result of averaging of the subsamples may not accurately represent the light scattering provided by the particle of interest. For example, some samples representing the interference components caused by ambient light may be discarded, and the averaging operation may not reduce/eliminate the interference components.

In some examples, processing circuit 102 can perform a reconstruction operation on the detection signals 122 generated from a skip pulse pattern (e.g., example skip pulse patterns of FIG. 2), to reconstruct full samples of the light scattering condition from the subsamples/compressed data. The full samples can then be averaged (or processed in other ways) to extract the DC component attributed to the light scattering by the particles of interest. In some examples, the reconstruction can be based on the principle of dimensionality reduction, where real-world data can be structured and can be described by a small number of variables representing intrinsic dimensions. Accordingly, full samples of a current light scattering condition (in a current measurement period) can be represented by a sparse linear combination of multiple sets of full samples of historical light scattering conditions obtained in prior measurement periods. The sparse linear combination can include scaling a subset of the multiple sets of full samples using a set of sparse coefficients and summing the scaled subset. Processing circuit 102 can determine the set of sparse coefficients based on fitting the subsamples obtained in a current measurement period with the multiple sets of full samples of historical light scattering conditions, and perform sparse linear combination of the full samples of historical light scattering conditions using the set of sparse coefficients to reconstruct the full samples for the current measurement period.

In some examples, the full samples of historical light scattering conditions can reflect various historical operation conditions of light scattering measurement device 100, such as presence or absence of particles of interest in ambient light. Such arrangements allow the reconstructed full samples to also include the interference components in detection signals 122 caused by the ambient light. The interference components can be removed/attenuated by averaging of the full samples, which allows light scattering measurement device 100 to detect the particles of interest in a chamberless (or partial chamberless) arrangement.

As to be described below, light scattering measurement device 100 can operate in a training mode. During the training mode, light source 106 is disabled, so that the light received by light detector 108 is ambient light, which may or may not be scattered by particles of interest. Light scattering measurement device 100 can operate in the training mode in multiple measurement periods, and generate the full samples of historical light scattering conditions including ambient light data based on detection signals 122 received from light detector 108 in the measurement periods. The full samples of historical light scattering conditions are generated by sampling the ambient light at the unit intervals t0 corresponding to, for example, the uniform pulse pattern of graph 202. After the training mode completes, light scattering measurement device 100 can operate in a sensing mode. In the sensing mode, light scattering measurement device 100 can operate light source 106 to transmit light pulses according to a skip pulse pattern (such as those shown in FIG. 2) in subsequent measurement periods to generate subsamples of the light scattering condition, reconstruct full samples from the subsamples, and determine whether particles of interest are detected and/or a concentration of such particles based on the reconstructed full samples.

Figure 3:
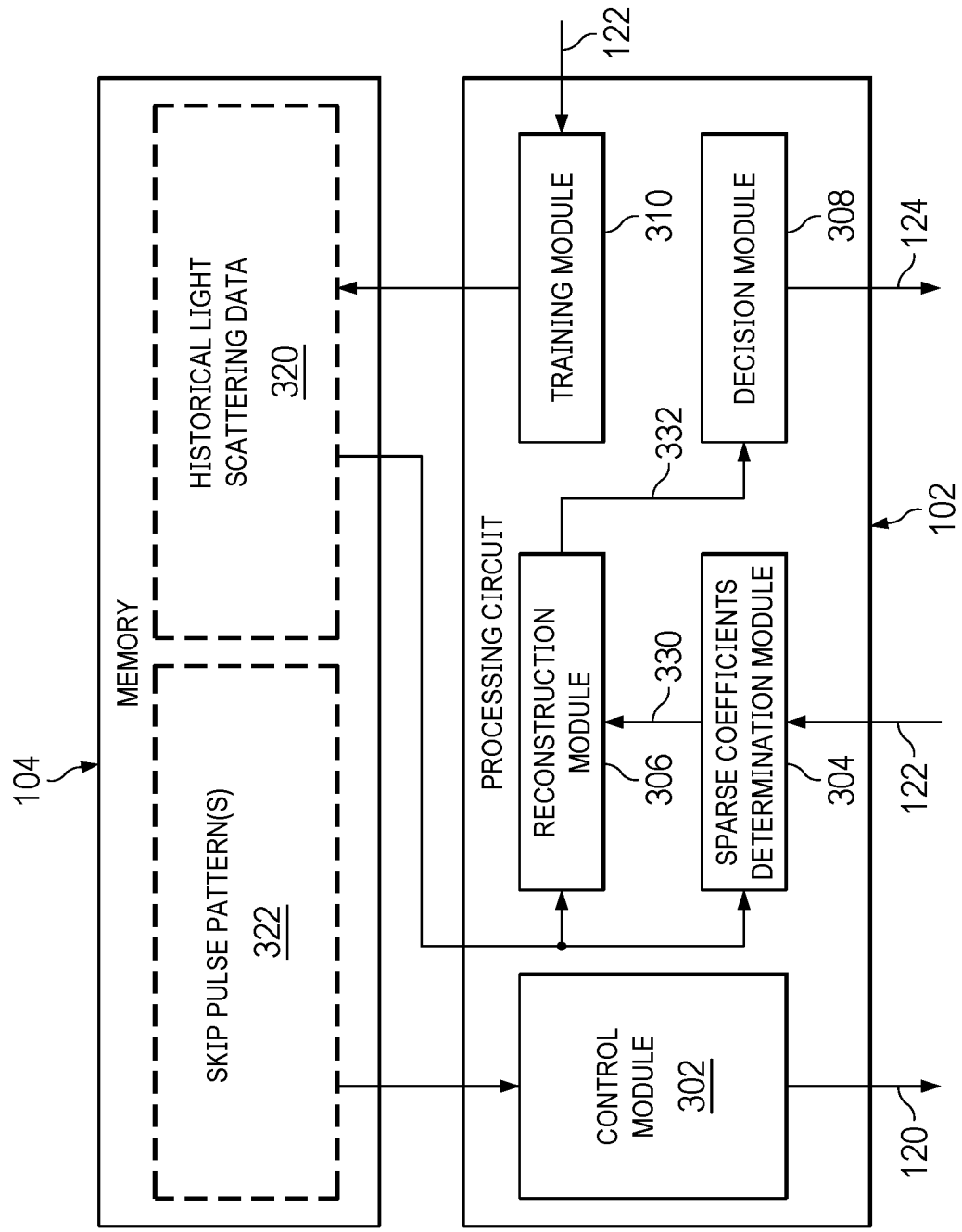
FIG. 3 is a schematic diagram of internal components of a light scattering measurement device, in accordance with various examples.

FIG. 3 is a schematic diagram illustrating example internal components of processing circuit 102 to support the reconstruction operation. Referring to FIG. 3, processing circuit 102 may include a control module 302, a sparse coefficients determination module 304, a reconstruction module 306, a decision module 308, and a training module 310. Also, memory 104 can store a set of historical light scattering data 320 and one or more skip pulse patterns 322.

Control module 302 can set the operation mode of processing circuit 102 and light scattering measurement device 100. During the sensing mode, control module 302 can retrieve a skip pulse pattern from the skip pulse patterns 322 from memory 104, which can define the timing of the light pulses in a measurement period, and provide control signal 120 based on a skip pulse pattern from skip pulse patterns 322 to light source 106. Light source 106 can then emit light pulses in the measurement period according to skip pulse pattern 322. In some examples, control module 302 can control light source 106 to transmit light pulses according to a first skip pulse pattern across a first set of measurement periods, and to transmit light pulses according to a different skip pulse pattern across a second set of measurement periods.

Also, processing circuit 102 can perform demodulation, sampling, and digitalization operations on detection signals 122 to generate subsamples of the light scattering condition in the measurement period (e.g., M samples in a measurement period), and provide the subsamples to sparse coefficients determination module 304. Sparse coefficients determination module 304 can also retrieve historical light scattering data 320 from memory 104. As described above, the historical light scattering data 320 can represent prior ambient light condition, which may or may not include the particles of interest, sampled at unit intervals of t0 corresponding to, for example, the uniform pulse pattern of graph 202. As to be described in detail below in FIG. 4, in some examples, historical light scattering data 320 can be a dictionary providing redundant data. Sparse coefficients determination module 304 can determine a set of sparse coefficients 330 based on fitting the subsamples obtained in the measurement period with historical light scattering data 320, and provide the set of sparse coefficients 330 to reconstruction module 306. Reconstruction module 306 can also retrieve historical light scattering data 320 from memory 104, and reconstruct full samples of light scattering condition 332 by a sparse linear combination of the historical light scattering data 320 using the set of sparse coefficients 330. Reconstruction module 306 can then provide the reconstructed full samples of light scattering condition 332 to decision module 308, which can extract DC component by, for example, averaging the reconstructed full samples. Decision module 308 can also generate indication signal 124 based on the extracted DC component indicating, for example, whether particles of interest are detected, and/or a concentration of such particles.

Figure 4:
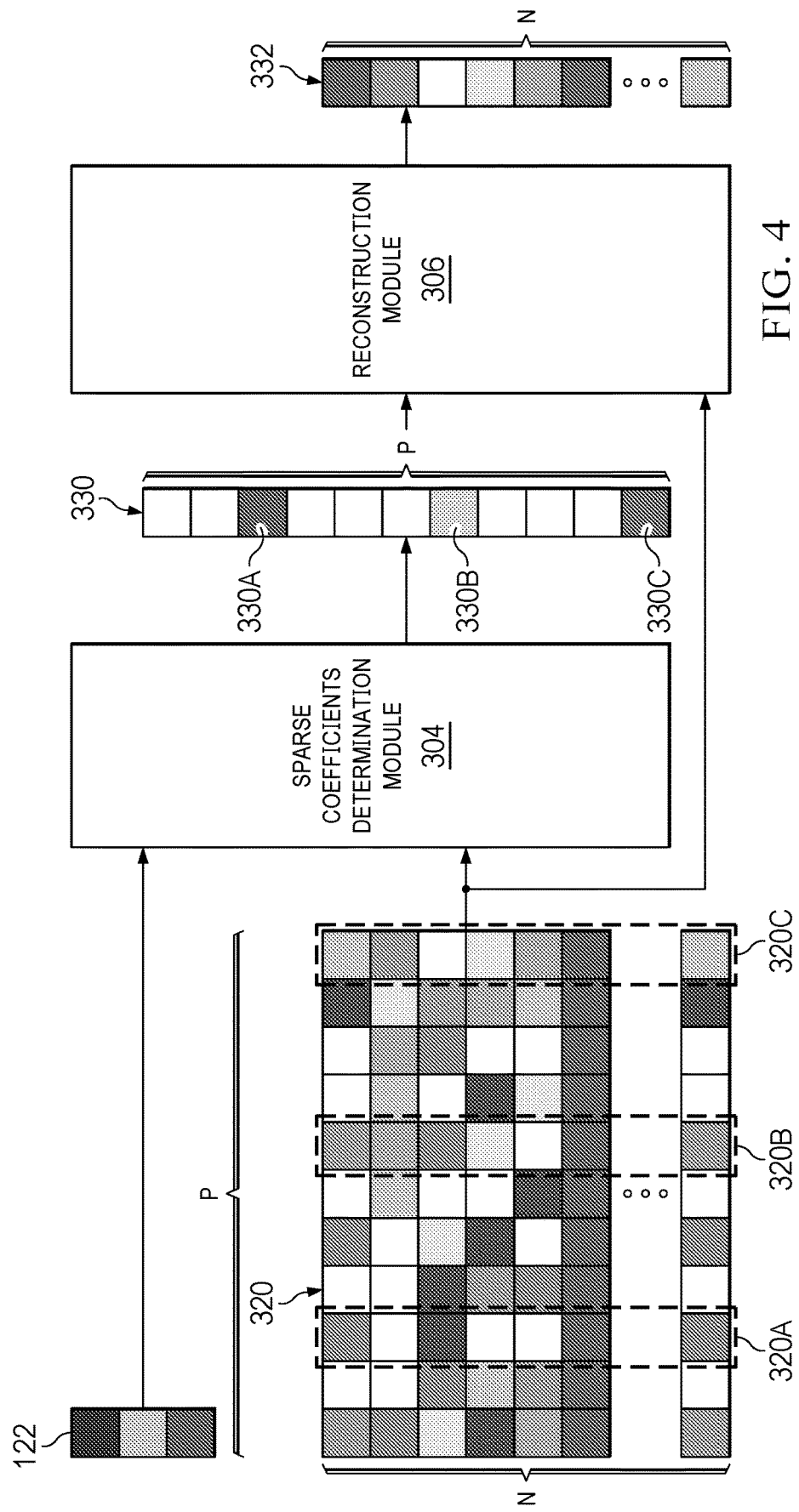
FIG. 4 is a schematic diagram illustrating operations of a light scattering measurement device, in accordance with various examples.

FIG. 4 is a schematic diagram illustrate example operations of sparse coefficients determination module 304 and reconstruction module 306. Referring to FIG. 4, sparse coefficients determination module 304 can receive historical light scattering data 320 and detection signals 122. Historical light scattering data 320 can be in the form of an N×P matrix. Each column of the matrix has N entries, and the matrix has P columns. In some examples, each set of N entries represent a set of fully-sampled historical light scattering data from sampling prior ambient light condition at unit intervals of t0 in a measurement period. In some examples, the set of N entries in a column can be in frequency domain, and one of the N entries (e.g., the top most entry) can represent the DC component. Also, historical light scattering data 320 includes P columns. Each column can represent a particular ambient light condition, or ambient light condition sampled at a particular measurement period, and historical light scattering data 320 includes samples from P measurement periods. Each row of the N×P matrix of historical light scattering data 320 represents a set of features sampled at a particular time across the P measurement periods. Also, detection signals 122 can represent subsamples of a current light scattering condition obtained using a skip pulse pattern in a measurement period, and can include M number of samples where M is lower than N. In the example of FIG. 4, M equals 3. Sparse coefficients 330 can be a P×1 matrix, with each entry of the P×1 matrix corresponding to one column of the N×P matrix of historical light scattering data 320.

As described above, sparse coefficients determination module 304 can determine a set of sparse coefficients 330 based on fitting the subsamples represented by detection signals 122 with historical light scattering data 320. In some examples, sparse coefficients determination module 304 can perform operations to solve an optimization problem represented by the following Equation:

$$\min_x \left[ \sum_{t=i_1}^{i_M} (y_t - d_t^T x)^2 \right] + f(x) \qquad \text{(Equation 1)}$$

In Equation 1, y represents detection signals 122 and can be in the form of an M×1 matrix, d represents historical light scattering data 320 and can be in the form of an N×P matrix, and x represents the sparse coefficients 330 to be determined and can be in the form of a P×1 matrix. Also, t represents an index, where $y_t$ is an entry in the M×1 matrix of detection signals 122 representing a particular subsample, and dt represents a row of N×P matrix of historical light scattering data 320, which also represents a set of features sampled at a particular time across the P measurement periods. The term $d_t^T x$ represents a sparse linear combination of historical light scattering data 320 with sparse coefficients 330, and $(y_t - d_t^T x)^2$ represents a residual error between the sparse linear combination and a particular subsample. Further, f(x) is a regularization term to promote sparsity in the set of sparse coefficients 330, where a higher sparsity indicates a smaller number of non-zero sparsity coefficients in the set and vice versa. Sparse coefficients determination module 304 can perform the optimization operation is to determine a set of sparse coefficients 330 that minimizes the sum of residual errors across the subsamples as part of a fitting operation, while increasing (or maximizing) sparsity in the set of sparse coefficients 330 represented by the regularization term f(x).

Sparse coefficients determination module 304 can perform the optimization operation using various algorithms, such as Orthogonal Matching Pursuit (OMP) and FOCal Underdetermined System Solver (FOCUSS). In OMP, sparse coefficients determination module 304 can determine sparse coefficients 330 that provides a matching projection of the subsamples on the fully-sampled historical light scattering data 320, which includes determining the coefficients iteratively to maximize the correlation between x (the subsamples) and each column of d (historical light scattering data 320) while reducing/minimizing the residual errors. In FOCUSS, sparse coefficient determination module 304 solves a sequence of optimization problem given by Equation 1 where the regularization term involves a weighted norm, and the weights in an iteration are function of the solution of the previous iteration.

In the example of FIG. 4, sparse coefficients determination module 304 can generate a set of sparse coefficients 330 including non-zero coefficients 330A, 330B, and 330C corresponding to, respectively, columns 320A, 320B, and 320C of the N×P matrix of historical light scattering data 320. Reconstruction module 306 can generate full samples of light scattering condition 332 in a measurement period, which includes N samples and is represented by an N×1 matrix in FIG. 4, by a sparse linear combination of historical light scattering data 320 with sparse coefficients 330. In the example of FIG. 4, reconstruction module 306 can generate full samples of light scattering condition 332 by scaling the N×1 matrix of column 320A with coefficient 330A, scaling the N×1 matrix of column 320B with coefficient 330B, and scaling the N×1 matrix of column 320C with coefficient 330C, and summing the scaled N×1 matrices as the full samples of light scattering condition 332.

The operations in FIG. 4 are further described with the following Equations. Specifically, the historical light scattering data 320 of FIG. 4 (e.g., dictionary) can be represented by the N×P matrix D, which has N rows, as shown below:

$$D = \begin{bmatrix} d_{11} & \cdots & d_{1P} \\ \vdots & \ddots & \vdots \\ d_{N1} & \cdots & d_{NP} \end{bmatrix} \quad \text{(Equation 2)}$$

Sparse coefficients determination module 304 can determine the set of sparse coefficients 330 based on the following Equation:

$$y_{sub} = \begin{bmatrix} y_1 \\ \vdots \\ y_M \end{bmatrix} = D_M x = \begin{bmatrix} y_{11} & \cdots & y_{1P} \\ \vdots & \ddots & \vdots \\ y_{M1} & \cdots & y_{MP} \end{bmatrix} \begin{bmatrix} x_1 \\ \vdots \\ x_P \end{bmatrix} \quad \text{(Equation 3)}$$

In Equation 3 above, $y_{sub}$ represents the M×1 matrix of detection signals 122, which are subsamples of a light scattering condition. Also, x represents the P×1 matrix of the sparse coefficients 330 to be determined, and $A_M$ represents a subset of D (the dictionary). For example, $D_M$ can include M rows of D (which has N rows, with N larger than M). Sparse coefficients determination module 304 can determine the set of sparse coefficients 330 based on an optimization operation using various algorithms, such as OMP and FOCUSS as determined above.

Reconstruction module 306 can reconstruct the full samples $y_{full}$ of the light scattering condition represented by the subsamples $y_{sub}$ based on a sparse linear combination of the full dictionary D and the sparse coefficients x as follows:

$$y_{full} = Dx = x_1 \begin{bmatrix} y_{11} \\ \vdots \\ y_{N1} \end{bmatrix} + \ldots + x_P \begin{bmatrix} y_{1P} \\ \vdots \\ y_{NP} \end{bmatrix} \quad \text{(Equation 4)}$$

In Equation 4 above, one or more entries of x are zero, and the products between those entries and the corresponding column of the dictionary D also become zero. With each column of D representing one set of historical light scattering data, the sum of the products between each entry of x and a corresponding column of the dictionary D can provide a sparse linear combination of the multiple sets of historical light scattering data.

Referring again to FIG. 3, during the sensing mode, decision module 308 can generate indication signal 124 based on the reconstructed full samples of light scattering condition 332, which can be in the N×1 matrix. In a case where the full samples are in time domain, decision module 308 can perform averaging of the entries in the N×1 matrix to obtain the DC component. In a case where the full samples are in frequency domain, decision module 308 can select one of the entries in the N×1 matrix as the DC component. Decision module 308 can then generate indication signal 124 based on the DC component. For example, in a case where light scattering measurement device 100 is part of a smoke detector, decision module 308 can generate indication signal 124 indicating detection of smoke particles if the magnitude of the DC component exceeds a threshold.

In some examples, historical light scattering data 320 may include fewer than full samples (N) of the light scattering data, such as subsamples of historical light scattering conditions obtained using skip pulse patterns after subtracting its mean and appending an additional constant column at the end resulting in a dictionary of size M×(P+1) as opposed to N×P. In such examples, reconstruction module 306 may, rather than reconstructing the full samples of current light scattering condition, generate other data representing the current light scattering condition. For example, reconstruction module 306 may generate a signal representing an average of full samples of the current light scattering condition by extracting the sparse coefficient corresponding to the last column where historical light scattering data 320 provides subsamples of historical light scattering conditions obtained using skip pulse patterns.

As described above, control module 302 can operate in the training mode. During the training mode, control module 302 can disable light source 106, so that the light received by light detector 108 is ambient light, which may or may not be scattered by particles of interest. During the training mode, training module 310 can receive detection signals 122 from light detector 108 representing samples of the ambient light, and update historical light scattering data 320 based on detection signals 122.

Figure 5:
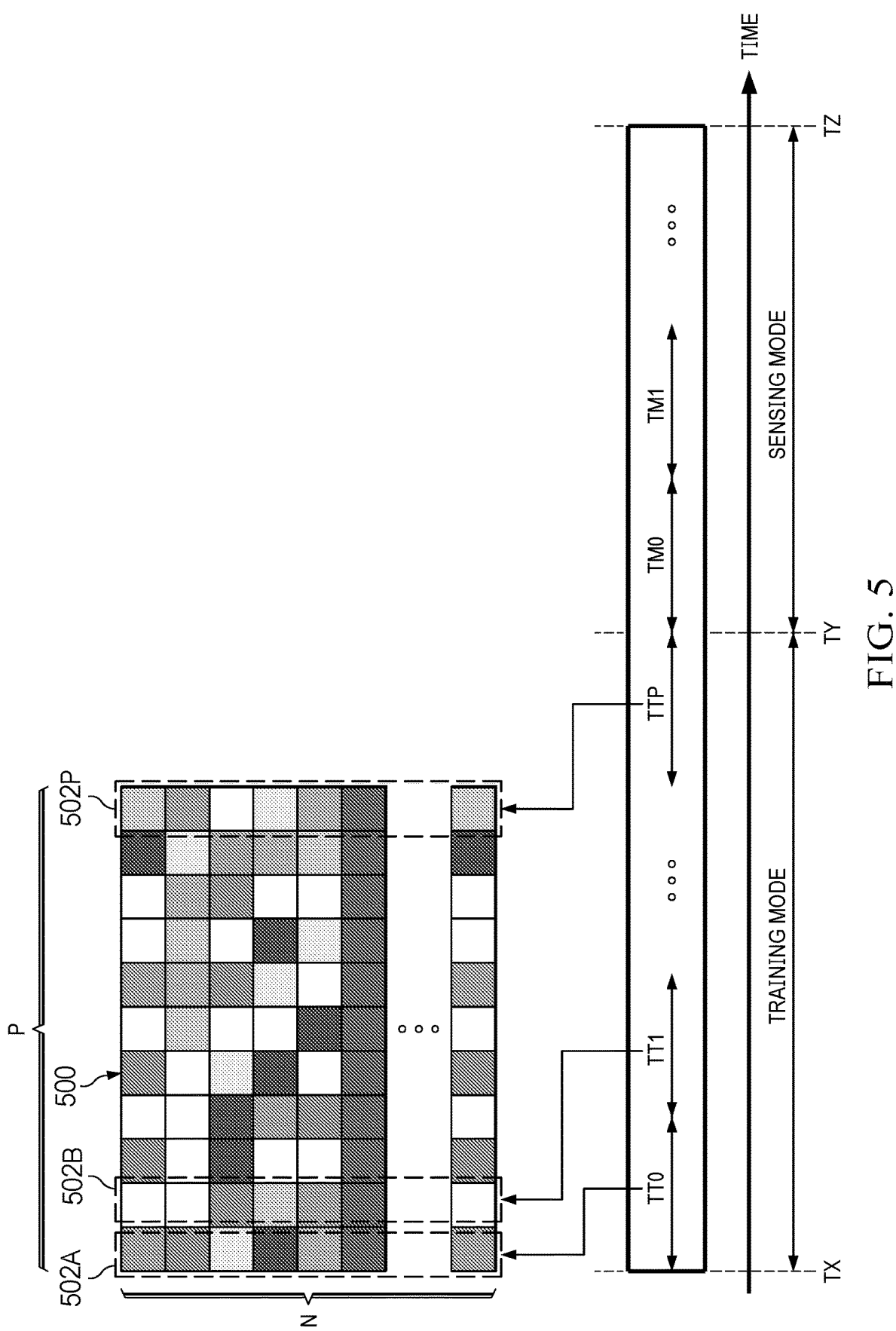
FIG. 5 includes graphs illustrating operations of a light scattering measurement device in various operation modes, in accordance with various examples.

FIG. 5 includes a graph 500 that illustrates example operations of training module 310 in the training mode. Referring to FIG. 5, between time TX and TY, control module 302 can operate light scattering measurement device 100 in a training mode across multiple measurement periods, such as TT0, TT1, and TTP, where each measurement period in the training mode can have the same duration as a measurement period in the sensing mode. Within each measurement period, light source 106 is disabled, and processing circuit 102 can receive detection signals 122 from light detector 108 representing samples of the ambient light. Processing circuit 102 can perform demodulation, sampling, and digitalization operations on detection signals 122 to generate the full samples of the ambient light condition (e.g., N samples with each sample evenly spaced apart by t0) for each measurement period. Training module 310 can update each column of the N×P matrix of historical light scattering data 320 based on the N samples of ambient light condition received for successive measurement periods. For example, training module 310 can update column 502A of historical light scattering data 320 based on the N samples received from measurement period TT0, column 502B based on the N samples received from measurement period TT1, and column 502P based on the N samples received from measurement period TTP.

In some examples, training module 310 can update each column of historical light scattering data 320 based on samples received in multiple samples. For example, the training mode can include multiple discrete phases. Within each phase, light scattering measurement device 100 can be exposed to a different ambient condition (e.g., changes in sunlight, changes in artificial light sources, etc.), and processing circuit 102 can generate multiple sets of N samples in multiple measurement periods in each phase. Training module 310 can then generate/update a column (N×1 matrix) of historical light scattering data 320 based on the multiple sets of N samples, so that each column of historical light scattering data 320 can represent a different ambient light condition.

Training module 310 can generate/update historical light scattering data 320 in various ways. In some examples, training module 310 can add a new column of historical light scattering data 320 from each measurement period rather than replacing a column of the data. In some examples, training module 310 may convert the full samples of the ambient light condition received from one measurement period from time domain to frequency domain, and store the frequency domain representation of the full samples as a column of historical light scattering data 320. In some examples, training module 310 can subtract out a mean value from the full samples and/or only store the samples corresponding to the skip pulse pattern to be used for subsampling the light scattering condition, as described above. Such arrangements can reduce the memory footprint of historical light scattering data 320 and eliminate the need to perform the averaging operation during the sensing mode.

After the updating of the N×P matrix of historical light scattering data 320 completes at TY, control module 302 can stop the training mode and switch to the sensing mode. Between TY and TZ, control module 302 can operate in the sensing mode across multiple measurement periods such as TM0 and TM1. In each measurement period in the sensing mode, control module 302 can control light source 106 with a skip pulse pattern, and sparse coefficients determination module 304 can receive subsamples of the light scattering condition in each measurement period, and generate sparse coefficients based on fitting the subsamples with the updated N×P matrix of historical light scattering data 320. Reconstruction module 306 can also generate reconstructed full samples of the light scattering condition 332 using the updated N×P matrix of historical light scattering data 320, as described above.

In some examples, control module 302 can also control light source 106 to transmit a sequence of light pulses (e.g., following a uniform pulse pattern) during the training mode, and training module 310 can generate historical light scattering data 320 from detection signals 122 representing detection of the sequence of light pulses. Such training operation can be performed in an environment where the particles of interest are absent, or the concentration of such particles is below a threshold (e.g., a threshold below which the particles are not regarded as detectable). Such historical data can also represent an ambient condition and allow light scattering measurement device 100 to more accurately detect low concentration (or absence) of the particles of interest.

Control module 302 can enter training mode and update historical light scattering data 320 under various conditions. For example, control module 302 may enter training mode periodically. As another example, control module 302 may enter training mode because no historical light scattering data 320 is stored in memory 104 or the data is inaccessible from memory 104.

In some examples, control module 302 can detect changes in the ambient light/interference that light scattering measurement device 100 is exposed to, and enter training mode responsive to the detected changes. For example, control module 302 can determine a variance among the subsamples received by sparse coefficients determination module 304 in a measurement period. The variance of subsamples from a measurement period can represent the time-varying interference component. Control module 302 can compare the variance against a threshold and, if the variance exceeds a threshold which indicates strong interference, control module 302 may enter training mode to update historical light scattering data 320.

As another example, after sparse coefficients determination module 304 generates a set of sparse coefficients 330 from the subsamples from a measurement period and from historical light scattering data 320, control module 302 can determine the sum of residual errors across the subsamples ($\Sigma_{t=i_1}^{i_M}(y_t-d_t^T x)^2$ in Equation 1), and compare the sum against a threshold. If the sum of residual errors exceeds a threshold, it may indicate that historical light scattering data 320 no longer accurately represent the current interference received by light scattering measurement device 100, so that a large residual error remains at the end of the optimization operation. Accordingly, if the sum of residual errors exceeds a threshold, control module 302 can also enter training mode.

Figure 6:
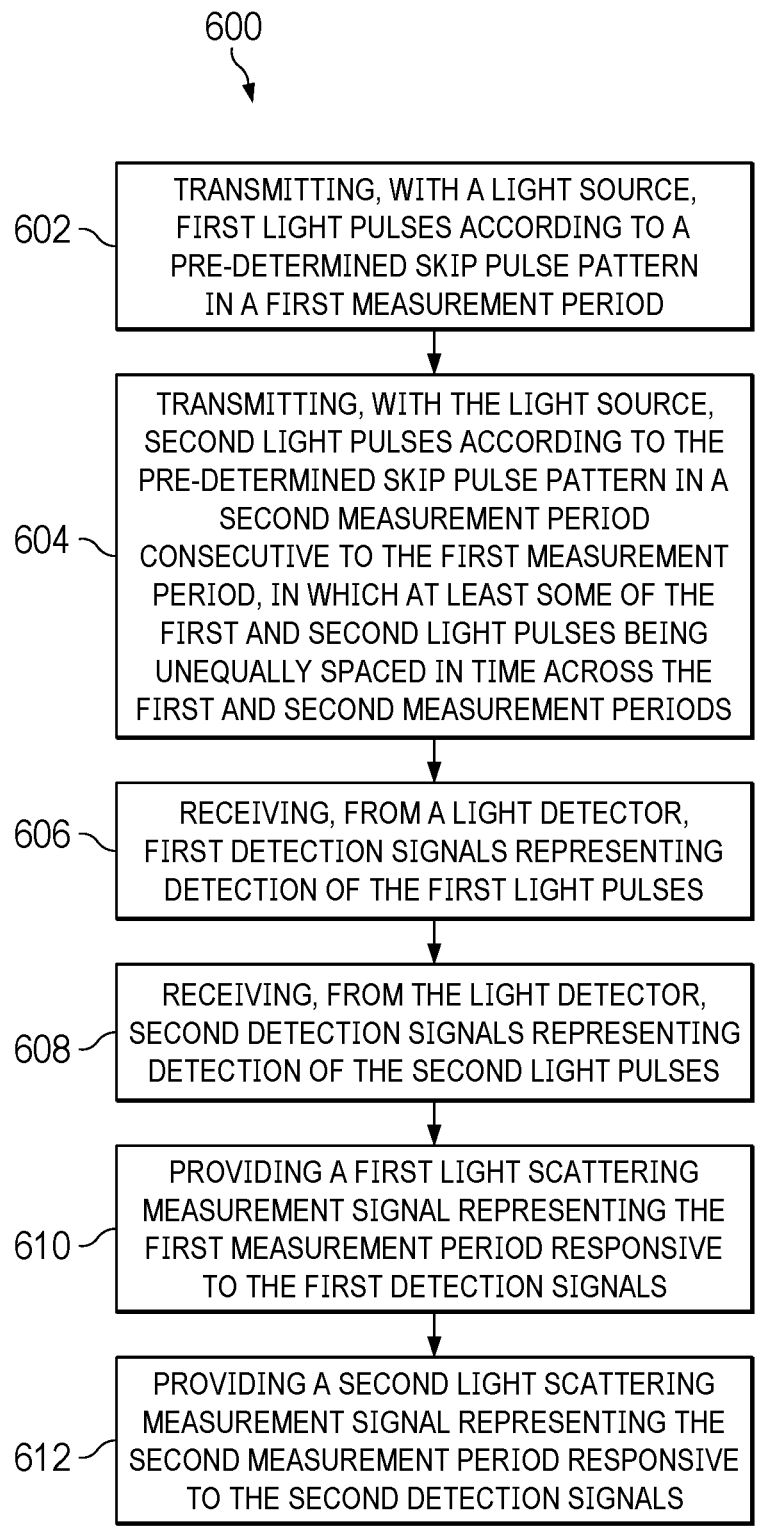
FIG. 6 is a flow diagram of a light scattering measurement method, in accordance with various examples.

FIG. 6 is a flow diagram of a light scattering measurement method 600, in accordance with various examples. In some examples, the method 600 is implemented by the light scattering measurement device 100 via one or more components of the light scattering measurement device 100. The method 600 may be implemented to provide light scattering measurements based on transmitted light pulses and corresponding detection signals. In some examples, the method 600 is implemented as computer-executable instructions stored on a non-transitory computer readable medium, such as the memory 104. The computer-executable instructions are executable by a processor or processing circuit, such as the processing circuit 102, to cause the processor to perform the operations of the method 600.

At operation 602, the light scattering measurement device 100 transmits, with a light source, first light pulses according to a pre-determined skip pulse pattern in a first measurement period. Examples of the skip pulse pattern are shown in FIG. 2.

At operation 604, the light scattering measurement device 100 transmits, with the light source, second light pulses according to the pre-determined skip pulse pattern in a second measurement period adjacent to the first measurement period, in which at least some of the first and second light pulses being unequally spaced in time across the first and second measurement periods. Adjacent light pulses among the first and second light pulses can be separated by a multiple of an unit interval t0. The number of light pulses transmitted in each of the first and second measurement periods according to the skip pulse pattern (M) is lower than the number of light pulses that would have been transmitted according to a uniform pulse pattern with the same unit interval to (N), to reduce power consumption by the light source.

At operation 606, the light scattering measurement device 100 receives, from a light detector, first detection signals representing detection of the first light pulses. As described above, each detected light pulse represented by the first detection signals can represent a sample of the light scattering condition to be detected/measured by the light scattering measurement device 100, and the number of samples received in a measurement period can be equal to the number of light pulses transmitted in that measurement period. Accordingly, the first detection signals can represent first subsamples of the light scattering condition in the first measurement period. Processing circuit 102 can perform demodulation on the first detection signals to convert to a baseband signal, and sample and digitalize the baseband signal to generate first digital samples.

At operation 608, the light scattering measurement device 100 receives, from the light detector, second detection signals representing detection of the second light pulses. The second detection signals can represent second subsamples of the light scattering condition in the second measurement period.

At operation 610, the light scattering measurement device 100 provides a first light scattering measurement signal representing the first measurement period responsive to the first detection signals. The first light scattering measurement signal may include, for example, indication signal 124 indicating whether particles of interest (e.g., smoke particles, blood cells, etc.) are detected and/or a concentration of the particles of interest.

As described above, processing circuit 102 can perform a reconstruction operation on the detection signals 122 generated from a skip pulse pattern (e.g., example skip pulse patterns of FIG. 2), to reconstruct full samples of the light scattering condition from the subsamples/compressed data. The full samples can then be averaged (or processed in other ways) to extract the DC component attributed to the light scattering by the particles of interest. Sparse coefficients determination module 304 can determine a first set of sparse coefficients based on fitting the first subsamples obtained in the first measurement period with multiple sets of full samples of historical light scattering data 320 from memory 104 in an iterative optimization operation (e.g., OMP and FOCUSS). Reconstruction module 306 can then reconstruct first full samples of the light scattering condition in the first measurement period based on a sparse linear combination of the full samples of historical light scattering conditions using the first set of sparse coefficients. Decision module 308 can generate the first light scattering measurement signal based on, for example, averaging the first full samples.

At operation 612, the light scattering measurement device 100 provides a second light scattering measurement signal representing the second measurement period responsive to the second detection signals. Sparse coefficients determination module 304 can determine a second set of sparse coefficients based on fitting the second subsamples obtained in the second measurement period with multiple sets of full samples of historical light scattering data 320 from memory 104 in an iterative optimization operation (e.g., OMP and FOCUSS). Reconstruction module 306 can then reconstruct second full samples of the light scattering condition in the second measurement period based on a sparse linear combination of the full samples of historical light scattering conditions using the second set of sparse coefficients. Decision module 308 can generate the second light scattering measurement signal based on, for example, averaging the second full samples.

In some examples, the full samples of historical light scattering data 320 can reflect various historical operation conditions of light scattering measurement device 100, such as presence or absence of particles of interest in ambient light. Such arrangements allow the reconstructed full samples to also include the interference components in detection signals 122 caused by the ambient light. The interference components can be removed/attenuated by averaging of the full samples, which allows light scattering measurement device 100 to detect the particles of interest in a chamberless (or partial chamberless) arrangement.

The full samples of historical light scattering data 320 can be updated by processing circuit 102 while operating in a training mode. Processing circuit 102 can enter training mode based on various conditions. For example, processing circuit 102 may enter training mode periodically. As another example, control module 302 may enter training mode because no historical light scattering data 320 is stored in memory 104 or the data is inaccessible from memory 104. As another example, control module 302 can detect changes in the ambient light/interference that light scattering measurement device 100 is exposed to (e.g., based on variance among subsamples in a measurement period), and enter training mode responsive to the detected changes. As another example, control module 302 can enter training mode if the residual errors between the reconstructed full samples and the historical data at the end of the optimization operation exceed a threshold.

Figure 7:
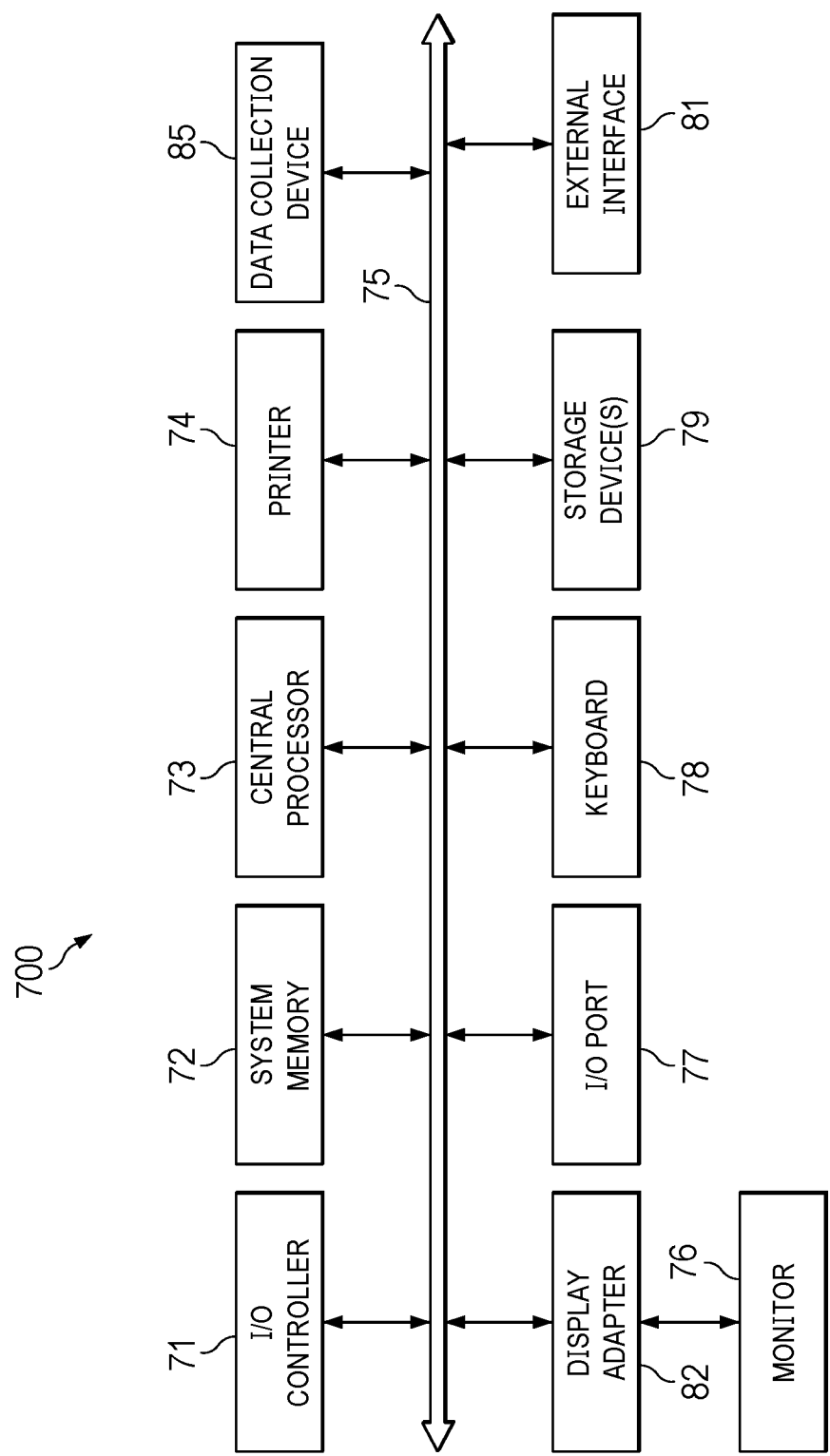
FIG. 7 is a block diagram of an example computing device that can perform a light scattering measurement method, in accordance with various examples.

FIG. 7 illustrates an example hardware computing system 700 that can be part of light scattering measurement device 100. The hardware computing system 700 includes a number of example subsystems. The subsystems shown in FIG. 7 are interconnected via a system bus 75. Additional subsystems such as a printer 74, keyboard 78, storage device(s) 79, monitor 76 (which is coupled to display adapter 82) and others are shown. Peripherals and input/output (I/O) devices, which couple to I/O controller 71, can be connected to the hardware computing system by any number of means such as input/output (I/O) port 77 (e.g., Universal Serial Bus "USB," FireWire®). For example, I/O port 77 or external interface 81 (e.g. Ethernet, Wi-Fi, etc.) can be used to connect hardware computing system 700 to a wide area network such as the Internet, a mouse input device, or a scanner. The interconnection via system bus 75 allows the central processor 73, which may be, or include, the processing circuit 102, to communicate with each subsystem and to control the execution of a plurality of instructions from system memory 72 or the storage device(s) 79 (e.g., a fixed disk, such as a hard drive, or optical disk), and the exchange of information between subsystems. The system memory 72 and/or the storage device(s) 79 may embody a computer-readable medium, and may be implemented as the memory 104. In some examples, central processor 73 can execute instructions stored in system memory 72 and/or storage device(s) 79 to perform the example computations and methods described above with respect to any of the preceding drawings herein. The central processor 73 can use system memory 72 to store the input data, output data, as well as intermediary data generated from the performance of the method. Another subsystem is a data collection device 85, such as the light detector 108 of FIG. 1. Any of the data described herein can be output from one component to another component and can be provided to the user.

A hardware computing system can include the same components or subsystems, e.g., connected together by external interface 81 or by an internal interface. In some embodiments, hardware computing systems, subsystem, or apparatus can communicate over a network. In such instances, one computer can be a client and another computer a server, where each can be part of a same computer system. A client and a server can each include multiple systems, subsystems, or components.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
a processing circuit having a processing input, a processing output, and a control output, the processing circuit configurable to:
provide control signals includiing pulses at the control output according to a pre-determined skip pulse patter, at least some of the pulses being unequally spaced in time;
receive detection signals at the processing input;
provide a signal indicative of a scattering measurement at the processing output responsive to the detection singal.

2. The apparatus of claim 1, wherein the skip pulse pattern indicates, within a measurement period, transmission of a number of the pulses spaced apart by a same interval, followed by a lull period in which no pulse is transmitted and the scattering measurement is of the measurement period.

3. The apparatus of claim 1, wherein the skip pulse pattern indicates, within a measurement period, transmission of a first number of the pulses spaced apart by a same first interval, followed by transmission of a second number of the pulses spaced apart by a same second interval, and the scattering measurement is of the measurement period.

4. The apparatus of claim 1, wherein the pulse pattern indicates that, within a measurement period, each adjacent pair of the pulses is spaced apart by a respective different interval, and the scattering measurement is of the measurement period.

5. The apparatus of claim 1, wherein each pair of adjacent pulses among the pulses is separated by an interval that is a multiple of a unit interval.

6. The apparatus of claim 1, wherein the processing input is a first processing input, the processing circuit has a second processing input, and the apparatus further comprises a memory having an output coupled to the second processing input, the memory configurable to store data representing multiple sets of historical detection signals in an ambient condition; and
wherein the processing circuit is configurable to:
receive the data at the second processing input; and
generate the signal indicative of the scattering measurement responsive on the data and the detection signals.

7. The apparatus of claim 6, wherein each set of the historical detection signals include at least a first number of samples within a first measurement period, the detection signals include a second number of samples within a second measurement period having a same duration as the first measurement period, and the first number exceeds the second number.

8. The apparatus of claim 6, wherein each set of the historical detection signals includes a first number of samples within a first measurement period, the detection signals include a second number of samples within a second measurement period having a same duration as the first measurement period, and the first number equals the second number.

9. The apparatus of claim 6, wherein the data represents the historical detection signals in time domain or in frequency domain.

10. The apparatus of claim 6, wherein the processing circuit is configurable to:
generate sparse coefficients responsive to fitting the detection signals with the multiple sets of the historical detection signals;
generate the signal indicative of the scattering measurement responsive to combining the multiple sets of the historical detection signals using the first sparse coefficients.

11. The apparatus of claim 10, wherein the signal is a first signal, and the processing circuit is configurable to:
generate second signals responsive to sparse linear combination of the multiple sets of the historical detection signals using the first sparse coefficients;
generate the first signal responsive to averaging the second reconstructed signals.

12. The apparatus of claim 10, wherein the signal is a first signal, and the processing circuit is configurable to:
generate second signals responsive to a sparse linear combination of the multiple sets of the historical detection signals using the first sparse coefficients;
determine a direct current (DC) component of the second reconstructed signals;
generate the first signal responsive to determining the DC component.

13. The apparatus of claim 10, wherein the memory has a memory input, the data is first data, the processing output is a first processing output, and the processing circuit has a second processing output coupled to the memory input, and the processing circuit is configurable to:
in a training mode, provide second data representing ambient characteristics at the second processing output, and store the second data in the memory.

14. The apparatus of claim 13, wherein the control signals have a first state during the pulses and a second state outside the pulses, the detection signals are first detection signals, and the processing circuit is configurable to, in the training mode:
within a measurement period, provide the control signals having the second state and receive second detection signals; and
generate the second data based on the second detection signals.

15. The apparatus of claim 14, wherein the processing circuit is configurable to enter the training mode periodically.

16. The apparatus of claim 14, wherein the processing circuit is configurable to:
determine a variance among samples of the first detection signals; and
responsive to the variance exceeding a threshold, enter the training mode.

17. The apparatus of claim 14, wherein the processing circuit is configurable to:
determine a first residual error responsive to the fitting of the detection signals with the multiple sets of the historical detection signals;
responsive to the residual error exceeding a threshold, enter the training mode.

18. The apparatus of claim 1, wherein the processing circuit is part of a smoke detector including a light source coupled to the control output and a light detector coupled to the processing input, the signal is a first signal, and the processing circuit is configurable to generate a second signal indicative of whether smoke is detected responsive to the first signal.

19. A method comprising:
transmitting, with a light source, light pulses according to a pre-determined skip pulse pattern, in which at least some of the pulses are unequally spaced in time;
receiving, from a light detector, detection signals representing detection of the first light pulses;
providing a light scattering measurement signal period responsive to the detection signals.

20. A computer readable medium comprising computer-executable instructions, executable by a processor to cause the processor to:
provide control signals including pulses according to a predetermined skip pulse pattern, at least some of the pulses being unequally spaced in time;
receive detection signals; and
provide a signal indicative of a scattering measurement responsive to the detection signals.

* * * * *